(No Model.)

E. J. PIKE.
SUSPENSORY BELT.

No. 529,750. Patented Nov. 27, 1894.

Witnesses
Arthur Meres

Inventor
Emma Janet Pike
per
Attorney

UNITED STATES PATENT OFFICE.

EMMA JANET PIKE, OF LONDON, ENGLAND.

SUSPENSORY BELT.

SPECIFICATION forming part of Letters Patent No. 529,750, dated November 27, 1894.

Application filed September 17, 1891. Serial No. 406,040. (No model.) Patented in England February 17, 1891, No. 2,867.

*To all whom it may concern:*

Be it known that I, EMMA JANET PIKE, a subject of the Queen of Great Britain, residing at Brompton, London, in the county of Middlesex, England, have invented Improvements in Suspensory Belts for Ladies, (for which I have obtained a patent in Great Britain, No. 2,867, bearing date February 17, 1891,) of which the following is a specification.

My invention relates to an improved suspensory device for ladies' sanitary napkins or pads and it has for its object to provide improved means of securing and retaining the same in position with a light elastic pressure and without the use of buckles, safety pins, buttons or other similar fastenings. To this end the invention consists of tabs or their equivalent of india rubber which are adapted as hereinafter described to act as holdfasts of themselves for the ends of the napkin or pad without the use of any other fastening. These tabs are permanently fixed to or made part of the belt and the belt is elastic and endless so as to dispense with any fastening device.

Figure 1:
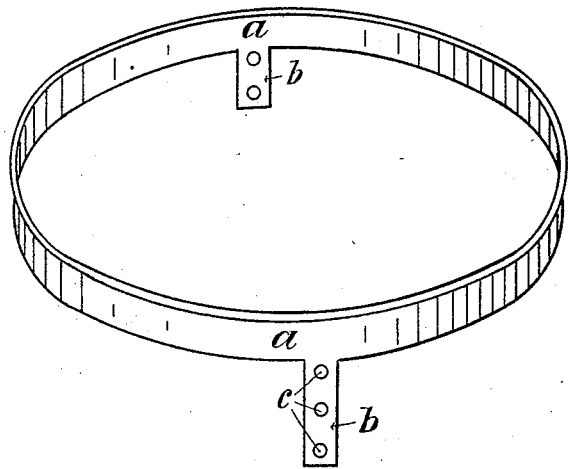
Figure 2:
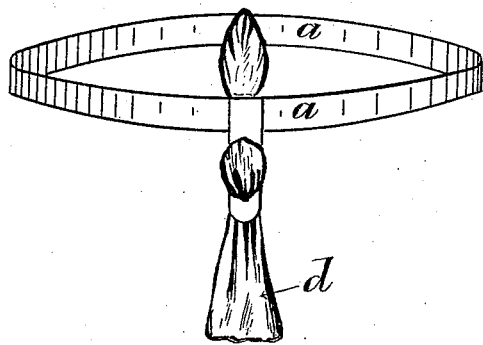

The accompanying drawings, forming part of this specification, represent at:—Figure 1, an endless belt made wholly of a strip of india rubber, the ends being cemented together and the tabs being of the same material and cut in one with the band. Fig. 2, shows a similar belt made of the same material as before, the tabs being cemented to the belt and such belt having a napkin attached thereto as hereinafter described.

Instead of having the belt of india rubber I may have it of elastic web, but the tabs for the purpose of this invention must always be of plain india rubber.

The waist belt $a$ is made of elastic material and provided with a pendent tab $b$, both at front and back made of a strip of india rubber having two or more small holes $c$, punched in it at intervals in its length. Through one or more of these holes the ends of the napkin or pad $d$ are to be threaded the rubber readily stretching to allow of this being done and by its construction securely retaining the ends when thus inserted.

Having now described my invention, what I claim, and desire to secure by Letters Patent, is—

The waist belt $a$ made of elastic material and provided with a pendent tab $b$ both at front and back made of a strip of india rubber each having two or more small holes $c$ punched in it at intervals in its length substantially as set forth.

EMMA JANET PIKE.

Witnesses:
WM. THOS. MARSHALL,
PERCY S. MATTOCKS.